United States Patent [19]

Firey

[11] Patent Number: 5,417,183
[45] Date of Patent: May 23, 1995

[54] UNIDIRECTIONAL DUAL THROUGHFLOW OF AIR FOR PRIMARY REACTORS OF CYCLIC CHAR BURNING ENGINES AND GASIFIERS

[76] Inventor: Joseph C. Firey, P.O. Box 15514, Seattle, Wash. 98115-0514

[21] Appl. No.: 223,665

[22] Filed: Apr. 6, 1994

[51] Int. Cl.[6] .................................... F02B 43/08
[52] U.S. Cl. ................................. 123/3; 60/39.12
[58] Field of Search ..................... 123/23, 3, 1 R; 60/39.12, 464

Primary Examiner—Noah P. Kamen

[57] ABSTRACT

By suitable use of product gas reservoirs together with expansion air reservoirs, a throughflow of reactant air through the rapid reaction zone of a cyclic char burning piston engine or gasifier is created. This throughflow direction of air motion during expansion is the same as that during compression. An increased extent of reaction per engine cycle can be achieved by use of such dual throughflow not only during compression but also during expansion.

5 Claims, 3 Drawing Sheets

UNIDIRECTIONAL DUAL THROUGHFLOW OF AIR FOR PRIMARY REACTORS OF CYCLIC CHAR BURNING ENGINES AND GASIFIERS

CROSS REFERENCES TO RELATED APPLICATIONS

This application is related to my following U.S. Patent applications:
1. *Product Gas Reservoirs for Cyclic Char Burning Engines and Gasifiers,* Ser. No. 07/876303, filed Apr. 30, 1992, now issued as U.S. Pat. No. 5,216,982 on Jun. 8, 1993.
2. *Producer Gas Reservoirs for Cyclic Char Fuel Oxidation Reactors,* Ser. No. 07/895739, filed Jun. 9, 1992, now issued as U.S. Pat. No. 5,257,497 on Nov. 2, 1993.
3. *Reversed Dual Throughflow of Air for Primary Reactors of Cyclic Char Burning Engines,* filed with U.S. Patent Office but filing receipt not yet received.

BACKGROUND OF THE INVENTION

1. Field of the invention

This invention is in the field of internal combustion engines and gasifiers and particularly the field of internal combustion engines and gasifiers burning solid fuels alone or in combination with liquid or gaseous fuels. The internal combustion engines can be of the piston and cylinder type or equivalent.

2. Description of the Prior Art

Prior art examples of char burning engines of the piston and cylinder type are described in the following U.S. Patents issued to applicant:
U.S. Pat. No. 4,372,256, Feb. 8, 1983
U.S. Pat. No. 4,412,511, Nov. 1, 1983
U.S. Pat. No. 4,698,069, Oct. 6, 1987
U.S. Pat. No. 4,794,729, Jan. 3, 1989
U.S. Pat. No. 5,109,808, May 5, 1992
U.S. Pat. No. 5,201,283, Apr. 13, 1993
U.S. Pat. No. 5,002,024, Mar. 26, 1991
U.S. Pat. No. 5,085,183, Feb. 4, 1992

In these example cyclic char burning engines and gasifiers air, or other reactant gas containing appreciable oxygen gas, is compressed into the pore spaces of a solid char fuel, contained within a separate primary reaction chamber, during a compression process and this is followed by expansion of the primary reacted gases, formed by reaction of oxygen with the char fuel, out of the pore spaces of the char fuel during an expansion process. This cycle of compression followed by expansion is repeated. This cycle of compression and expansion is created by a combined means for compressing and expanding, such as a piston operated within a cylinder, wherein the space enclosed by the piston crown and the cylinder walls is a variable volume chamber whose volume varies cyclically when the piston is reciprocated by an internal combustion engine mechanism for driving this combined means for compressing and expanding. Following each expansion process the reacted gases are largely removed from the variable volume chamber by an exhaust means. Fresh air is next supplied into the variable volume chamber by an intake means prior to the next following compression process. Thus an exhaust process followed by an intake process is interposed between each expansion process and the next compression process for a cyclic char burning engine or gasifier as is well known in the art of internal combustion engines. Each compression process occupies a compression time interval which is followed by an expansion process occupying an expansion time interval. The separate primary reaction chamber is contained within a pressure vessel container. A means for preheating the char fuel within the primary reaction chamber is used to bring the char fuel up to that temperature at which it will react rapidly with oxygen in adjacent compressed gases while the engine or gasifier is being started. Thereafter the means for preheating the char fuel can be turned off when the heat of the primary reaction becomes sufficient to keep the char fuel at or above this rapid reaction temperature. During starting a cranking means is used to drive the internal combustion engine mechanism. The detailed descriptions of cyclic char burning engines and gasifiers contained in the above listed U.S. Patents are incorporated herein by reference thereto.

The term char fuel is used herein and in the claims to include highly carbonaceous and largely solid fuels such as coal, coke, charcoal, petroleum coke, etc.

As char fuel is reacted to ashes within the primary reactor it is replaced by a refuel mechanism means for supplying fresh char fuel into a refuel end of the primary reactor. The char fuel is thus moved along through the primary reactor toward an opposite ash collection end of the primary reactor. Hence the char fuel being reacted within the primary reactor has a direction of motion from the refuel end toward the ash collection end. An ash removal mechanism is used as a means for removing ashes from the primary reaction chamber.

Where air is the reactant gas it is readily available from the atmosphere. In some applications oxygen enriched air or essentially pure oxygen may be used as the reactant gas, as for example in some gasifier uses, and here a source of oxygen rich gas is needed.

The term rapid reaction temperature is used herein and in the claims to mean that temperature of the char fuel at which it will react with the supplied reactant gas containing oxygen gas sufficiently rapidly to maintain the char fuel temperature at or above this rapid reaction temperature due only to the heat of the reaction between the char fuel and this reactant gas. This rapid reaction temperature varies with the kind of char fuel being reacted, the oxygen content of the reactant gas, and the operating conditions prevailing within the char fuel reaction chamber.

For the same reactant gas and operating conditions different char fuels have different rapid reaction temperatures, some charcoals reacting rapidly with air in usual type reactors at temperatures as low as 1200° F. whereas some petroleum coke fuels will only react rapidly with air at temperatures above about 1500° F.

For a particular char fuel and operating condition a higher rapid reaction temperature is required when the oxygen content of the reactant gas is reduced since more of the heat of char and oxygen reaction is diverted to the heating up of non reactive portions of the reactant gas. Below a certain minimum oxygen content the reaction between the char fuel and the oxygen is too slow to sustain itself by its own heat of reaction, and the term appreciable oxygen gas content of reactant is used herein and in the claims to mean an oxygen content greater than this minimum value. Ordinary air, with an oxygen gas content of about 21 volume percent, will usually react readily with most commonly available hot char fuels in reasonably well insulated reaction chambers, and is an example of a reactant gas containing appreciable oxygen gas suitable for use in most gas producers. In some gas producer applications oxygen enriched air or essentially pure oxygen has been used as the reactant gas containing appreciable oxygen gas. Reactant gases containing less oxygen than air, while theoretically useable in gas producers, have rarely, if ever, been so used.

As the char fuel reaction chamber becomes smaller, external heat loss rate increases, and the char fuel must be brought to a higher temperature, and thus higher reaction speed, in order for the char fuel and oxygen gas reaction to be self sustaining. We thus see that the rapid reaction temperature is not a property of the char fuel alone and can only be determined experimentally within the reaction chamber to be used, and with the oxygen containing reactant gas to be used.

In some engine applications of cyclic char burning engines and gasifiers, the variable volume chamber of the internal combustion engine may also be used as a secondary reaction chamber wherein primary reacted gases from the primary reactor are burned completely with secondary air during the expansion process. For these applications the needed secondary air is retained outside the primary reactor during compress/on and is admixed with the primary reacted gas emerging from the primary reactor during expansion. The resulting air fuel mixture is then ignited by an igniter means within the secondary reactor in the variable volume chamber. Thus this form of cyclic char burning engine requires use of a suitable igniter means within the variable volume chamber. In some gasifier uses of cyclic char burning engines and gasifiers secondary air is not thusly retained outside the primary reactor and the variable volume chamber is not also used as a secondary reaction chamber. For both such engine uses and such gasifier uses net work output can be done on the piston, since the various reactions of char fuel with oxygen and of product gases with oxygen are exothermic reactions which are carried out under the varying pressures of the engine cycle. Herein and in the claims the term power reactor is used to mean either a cyclic char burning engine or a cyclic char burning gasifier.

The term flow connection is used herein and in the claims to mean a passage through which gases may flow. Within some flow connections a unidirectional flow, such as a check valve, may be inserted so that gas flows always in the same direction through that flow connection. Check valves or timed, driven, valves, are examples of unidirectional flow means. A flow connection connects to gas flow openings into the primary reactor and into the reservoirs added thereto.

As the char fuel, within the primary reactor, moves along the char fuel motion direction it is preheated by heat transfer from char fuel portions which are further along and are reacting rapidly with oxygen and thus are at a high temperature. Where the char fuel being used is essentially free of volatile matter, as with coke fuel, this preheat zone serves to bring the new char fuel up to its rapid reaction temperature. The char fuel then enters the rapid reaction zone and carbon reacts therein with oxygen to form producer gas. Beyond the rapid reaction zone in the direction of char fuel motion the char fuel is essentially completely reacted to ashes which pass into an ash collection zone at the end of the char fuel motion path.

In prior art cyclic char burning engines and gasifiers the ashes are removed from the ash collection zone of the primary reactor at the end of the char fuel motion path by an ash removal mechanism. Most such ash removal mechanisms remove a volume of material at intervals and it is necessary to control either the volume, or the interval, or both, so that only ashes, and no unburned char fuel, are removed.

Within the space occupied by the chunks of char fuel within the primary reactor two types of spaces exist. Within each char fuel chunk interior pore spaces exist in most char fuels. Between the char fuel chunks interstitial spaces exist.

SUMMARY OF THE INVENTION

To each primary reactor of a cyclic char burning piston type engine or gasifier is added, a product gas reservoir, and an expansion air reservoir. These reservoirs are suitably connected to the primary reactor so that a flow of reactant air passes through the rapid reaction zone in the primary reactor during both the compression process and the expansion process. The direction of flow of reactant air through the primary reactor is the same during both compression and expansion. Such dual throughflow of reactant air increases the extent of char fuel reaction per engine or gasifier cycle and this is a principal beneficial object of this invention. This invention is particularly well suited for use on char burning engines using low volatile matter char fuels such as coke or charcoal.

DESCRIPTION OF THE PREFERRED EMBODIMENTS

Figure 1:
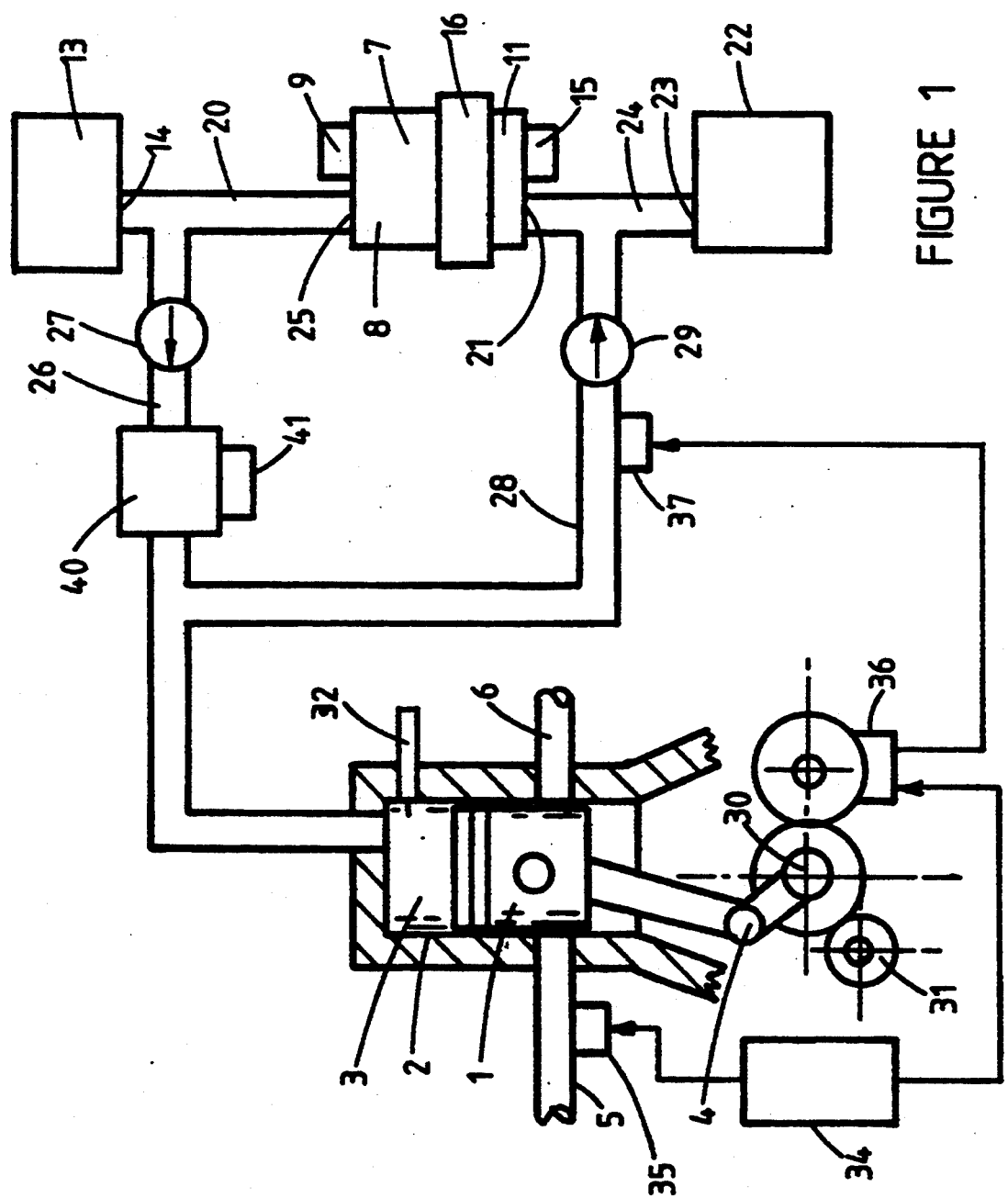
FIG. 1 shows a first embodiment of the combination of a piston engine and a char fuel gasifier.
Figure 2:
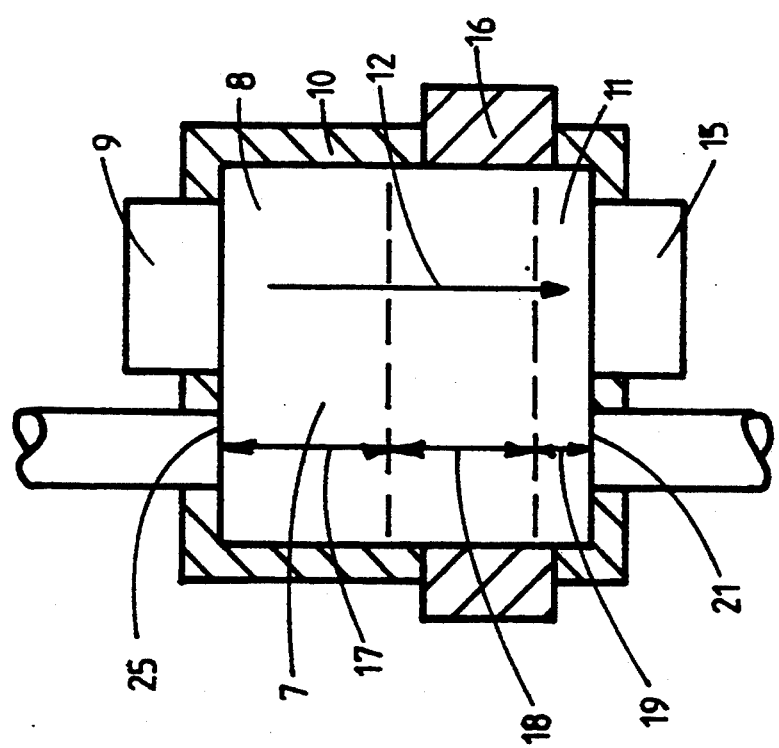
FIG. 2 shows a detailed cross-section of the pressure vessel and associated elements.

All forms of this invention are improvements to cyclic char burning engines or gasifiers using a separated primary reaction chamber, an example of which is shown schematically in FIG. 1 and 2, and comprises:

1. A combined means for compressing and expanding gases comprising: a piston, 1; operative within a cylinder, 2; and these enclosing a variable volume chamber, 3; whose volume varies cyclically as the piston is reciprocated by a drive means, 4. The drive means, 4, reciprocates the piston, 1, thus varying the volume of the variable volume chamber, 3, creating a compression process for a compression time interval when the piston, 1, is rising and decreasing the volume of the variable volume chamber 3, and creating an expansion process for an expansion time interval when the piston, 1, is descending and increasing the volume of the variable volume chamber, 3. The combined means for compressing and expanding shown in FIG. 1 further comprises: an intake means, 5, for placing air as reactant gas into the variable volume chamber, 3, prior to each compression process when the piston, 1, is at the bottom portion of its stroke; an exhaust means, 6, for removing reacted gases from the variable volume chamber, 3, after each expansion process when the piston, 1, is again at the bottom portion of its stroke. A two stroke cycle internal combustion engine mechanism is shown in FIG. 1 but four stroke cycle internal combustion engine mechanisms can also be used. Also drive means other than the crank and connecting rod mechanism of FIG. 1 can also be used such as the Wankel engine mechanism.

2. A separated primary reaction chamber, 7, contains char fuel which is added into the refuel end, 8, thereof by a refuel mechanism, 9, and this primary reactor comprises: a pressure vessel container, 10, to contain the primary reaction chamber, 7; an ash collection end, 11; a char fuel direction of motion, 12, from the refuel end, 8, toward the ash collection end, 11, in which direction the char fuel moves as it is being reacted and consumed within the primary reactor, 7; an ash removal mechanism, 15, which in this FIG. 1 and 2 example removes ashes from the ash collection end, 11, of the primary reactor, 7; a starting heater means, 16, for preheating the char fuel in the primary reactor, 7, up to that temperature at which it reacts rapidly with oxygen in adjacent compressed reactant gas when the engine is being cranked for starting, by the cranking means, 31.

3. The fresh char fuel refueled into the refuel end, 8, of the primary reactor, 7, is cold, and will not react with compressed air, but is heated by conduction from those char fuel portions deeper into the primary reactor which are at a high temperature and are reacting rapidly with oxygen to create producer gas. Thus the first portion, 17, of the primary reaction chamber along the char fuel motion direction, 12, is a char fuel preheat zone, 17, and distillation of volatile matter takes place here also when char fuels containing volatile matter are being used. At the end of the preheat zone, 17, the char fuel is at or above its rapid reaction temperature and enters the rapid reaction zone portion, 18, of the primary reaction chamber along the char fuel motion path, 12, where char fuel reacts rapidly with oxygen in adjacent compressed reactant gases. The heat of this reaction maintains the rapid reaction zone at or above the char fuel rapid reaction temperature. Within the rapid reaction zone, 18, of the char fuel reactor, 7, the carbon of the char fuel is gasified to producer gas and leaves only the ashes which collect in the ash zone, 19, at the ash collection end, 1:1, of the char fuel motion path, 12.

4. Means for connecting the primary reaction chamber, 7, to the variable volume chamber, 3, of the combined compressor and expander can be used for this invention as will be described hereinbelow.

The devices of this invention comprise additions to the primary reaction chamber, 7, and the combined compressor and expander means, and gas flow connecting means therebetween as follows:

5. A product gas reservoir, 13, is added, whose product gas reservoir gas flow opening, 14, is connected via a first flow connection, 20, to a gas flow opening, 25, at the refuel end, 8, of the primary reaction chamber, 7, for this FIG. 1 and FIG. 2 form of the invention.

6. An expansion reactant gas reservoir, 22, is added, whose expansion gas reservoir gas flow opening, 23, is connected via a second flow connection, 24, to a gas flow opening, 21, at the ash collection end, 11, of the primary reaction chamber, 7.

7. A third flow connection, 26, connects the variable volume chamber, 3, to the first flow connection, 20, and comprises a unidirectional flow means for creating unidirectional flow, 27, through connection, 26, so that gas flows only from the first flow connection, 20, toward the variable volume chamber, 3.

8. A fourth flow connection, 28, connects the variable volume chamber, 3, to the second flow connection, 24, and comprises a unidirectional flow means for creating unidirectional flow, 29, through connection, 28, so that gas flows only from the variable volume chamber, 3, toward the second flow connection, 24

9. The unidirectional flow means, 27, 29, can be pressure actuated check valves or valves driven and timed from the engine crankshaft, 30, as is well known in the art of gas compressors and internal combustion engines.

The particular example form of this invention shown in FIGS. 1 and 2 operates as follows:

10. When the cyclic char burning engine or gasifier of FIG. 1 is to be started, the starting heater means, 16, is energized, which heats up the char fuel in the primary reactor, 7, to its rapid reaction temperature. The internal combustion engine mechanism drive means, 4, is then cranked by the cranking means, 31, for starting and cycles of compression followed by expansion are created within the variable volume chamber, 3. Prior to each such compression air as reactant gas is placed inside the variable volume chamber, 3, by the intake means, 5. Following each such expansion reacted gas is removed from the variable volume chamber, 3, by the exhaust means, 6.

11. During compression time intervals, reactant air flows from the variable volume chamber, 3, into the second flow connection, 24, via the fourth flow connection, 28, and unidirectional flow means, 29. From the second flow connection, 24, some reactant air flows into the expansion reactant gas reservoir, 22, via the expansion gas reservoir gas flow opening, 23, and is stored therein during the compression time interval. From the second flow connection, 24, other reactant air flows into the primary reaction chamber, 7, via the ash collection end gas flow opening, 21.

12. As pressure rises during compression some portions of this other reactant air enter the interior pore spaces of the char fuel within the rapid reaction zone, 18, in the primary reactor and there reacts with the hot char fuel to form a producer gas. Still other portions of this other reactant air flow through the interstitial spaces in the primary reactor and there react in part with outer surfaces of the hot char fuel. The resulting product gases flowing through these interstitial spaces then flow on into the product 8as reservoir, 13, via the first flow connection, 20, and the product gas reservoir gas flow opening, 14, and are stored therein during compression.

13. During expansion time intervals, as the pressure decreases, producer 8as emerges from the interior pore spaces of the char fuel and, combined with stored producer gas emerging from the product gas reservoir, 13, flows into the variable volume chamber via the third flow connection, 26, and unidirectional flow means, 27. Stored reactant air flows out of the expansion reactant gas reservoir, 22, and into the primary reactor, 7, via the second flow connection, 24, and the ash collection end gas flow opening, 21. This expansion reactant air reacts with the hot char in the rapid reaction zone, 18, to form additional producer gas during expansion and this producer gas also flows through the interstitial spaces into the variable volume chamber, 3, via the first flow connection, 20, third flow connection, 26, and unidirectional flow means, 27.

14. In this way dual throughflow of reactant air is obtained wherein reactant air flows into and through the rapid reaction zone, 18, during compression time intervals and additional expansion reactant air flows through the rapid reaction zone, 18, also during expansion time intervals. Thus the duration and extent of the reaction between hot char fuel and reactant air can be increased since throughflow and reaction occurs, not only during compression time intervals, but also during expansion time intervals and this is one of the beneficial objects of this invention.

15. Where the cyclic char burning power reactor of this invention is an engine, producing power output as useful product, the producer gas flowing into the variable volume chamber, 3, during expansion is there admixed with secondary air and the resulting fuel in air mixture ignited by an igniter means for igniting fuel air mixtures, 32. The secondary air can be retained in the variable volume chamber at the end of the compression time interval, or can be stored in reactant air reservoirs during compression, as described for example in U.S. Pat. No. 4,698,069 and U.S. Pat. No. 4,794,729, and this material is incorporated herein by reference thereto.

16. Any one of several different types of starting heater means, 16, can be used such as electric heaters, or oil fired heaters, or fuel gas fired heaters. Examples of some starting heater means are described in the material incorporated by reference in the description of the prior art.

17. A particle separator means for separating solid and liquid particles, 40, can be installed between the variable volume chamber, 3, and the first flow connecting means, 20, in order to prevent carryover of these particles into the combined means for compressing and expanding. Various types of separator means can be used such as cyclone separators or other centrifugal force separators. An ash removal means, 41, can be added to the particle separator means, 40, to remove the collected particles.

18. When using char fuels of zero or very low hydrogen content steam additions to the reactant gases may be needed to obtain sufficiently rapid ignition and burning of carbon monoxide with oxygen in the secondary reactant gases. Steam may be thusly added by introducing steam from a steam source, 34, into the intake means, 5, of the combined means for compressing and expanding, 1, via a steam inlet, 35. Alternatively steam can be introduced into the reactant gases containing oxygen gas as these are flowing into the primary reactor, 7, and the expansion reactant gas reservoir, 22. Steam from the steam source, 34, can be added to reactant gases flowing through the fourth flow connection, 28, via a steam admission means, 36, and a steam inlet, 37. The steam admission means, 36, can be driven from the internal combustion engine mechanism in order to time steam admission to occur only during all compression time intervals. The added steam can function not only as a carbon monoxide ignition agent but also as a carbon gasifying agent.

19. As shown in FIG. 1 and FIG. 2 the unidirectional flow of gas through the primary reactor, 7, is from the ash collection end, 11, toward the refuel end, 8. With this flow direction the hot producer 8as formed in the rapid reaction zone, 16, flows over the cold incoming fresh char fuel and thus preheats this fuel up to its rapid reaction temperature.

This hot gas flow preheats the fresh char fuel more rapidly than is possible when preheat occurs only via solid state heat transfer through the char fuel chunks as is the case when 8as flow is unidirectional from the refuel end toward the ash collection end of the primary reaction chamber. Small volume primary reaction chambers are required for cyclic char burning engines of this invention in order to achieve adequate engine compression ratio and hence reasonable engine efficiency. There is thus only a small reactor cross sectional area available for solid state heat transfer through the char fuel chunks. Thus this char fuel preheat by flow of hot gases through the fresh char fuel is preferred for some primary reactors of cyclic char burning engines.

20. When char fuels containing appreciable volatile matter are being reacted in the primary reactor, 7, an opposite unidirectional flow of gas from the refuel end, 8, toward the ash collection end, 11, may sometimes be preferred. With this flow direction, the volatile matter distilled out of the char fuel in the preheat zone, 17, will be admixed with reactant air and this gaseous volatile matter in air mixture will be at least partially burned upon entering the high temperature rapid reaction zone. Such burnup of volatile matter within the primary reactor reduces the amount of tar created therein and passed on into the variable volume chamber. Tars create ring sticking and other problems in the internal combustion engine mechanism and this reduction of tars is thus beneficial.

Having thus described my invention what I claim is:

1. In a cyclic char burning power reactor comprising: at least one combined means for compressing and expanding gases, each said combined means comprising; an internal combustion engine mechanism comprising a variable volume chamber for compressing and expanding gases, and drive means for driving said internal combustion engine mechanism and for varying the volume of said chamber through repeated cycles, each cycle comprising a compression time interval followed by an expansion time interval, each said combined means for compressing and expanding further comprising, intake means for admitting reactant gases into said variable volume chamber prior to each said compression time interval, exhaust means for removing reacted gases from said variable volume chamber after each said expansion time interval; each said combined means for compressing and expanding being connected to a separate primary reaction chamber, within a pressure vessel container, each said primary reaction chamber comprising; a refuel end with a refuel mechanism means for supplying fresh char fuel particles into said refuel end, an ash collection end, a char fuel direction of motion from said refuel end toward said ash removal end, each said primary reaction chamber further comprising, a char fuel preheat zone positioned toward said refuel end of said primary reaction chamber, an ash collection zone positioned toward said ash collection end of said primary reaction chamber, and a rapid reaction zone positioned between said char fuel preheat zone and said ash collection zone, each said primary reaction chamber further comprising at least one means for removing ashes; said char burning power reactor being connected to a source of supply of reactant gas containing appreciable oxygen gas for each said intake means for admitting reactant gases into said variable volume chamber; said char burning power reactor further comprising: means for preheating said char fuel within said primary reaction chamber to that temperature at which said char fuel reacts rapidly with oxygen in adjacent compressed reactant gases when said char burning power reactor is being started; means for cranking said internal combustion engine mechanism when said char burning power reactor is being started:

an improvement comprising adding to each said primary reaction chamber:

a product gas reservoir comprising a product gas reservoir gas flow opening;

an expansion reactant gas reservoir comprising an expansion reactant gas reservoir gas flow opening;

said primary reaction chamber comprising two separate gas flow openings, a refuel end gas flow opening and an ash collection end gas flow opening;

a first flow connection between said product gas reservoir gas flow opening and one of said two separate gas flow openings of said primary reaction chamber;

a second flow connection between said expansion reactant gas reservoir gas flow opening and that other one of said two separate gas flow openings of said primary reaction chamber not connected to said first flow connection;

a third flow connection between said variable volume chamber and said first flow connection and comprising first unidirectional flow means for creating unidirectional flow therethrough only from said first flow connection;

a fourth flow connection between said variable volume chamber and said second flow connection and comprising second unidirectional flow means for creating unidirectional flow therethrough only into said second flow connection.

2. In a cyclic char burning power reactor as described in claim 1, wherein said first flow connection connects to said refuel end gas flow opening of said primary reaction chamber.

3. In a cyclic char burning power reactor as described in claim 1, wherein said first flow connection connects to said ash collection end gas flow opening of said primary reaction chamber.

4. In a cyclic char burning power reactor as described in claim 1, and further comprising:

separator means for separating solid and liquid particles from gases flowing therethrough, said separator means being placed in said third flow connection between said variable volume chamber and said first flow connection, said separator means comprising ash removal means for removing separated and collected solid and liquid particles from said separator means.

5. In a cyclic char burning power reactor as described in claim 1, and further comprising:

a source of steam steam admission means for adding steam from said steam source into said reactant gas containing appreciable oxygen gas flowing through said fourth flow connection during all compression time intervals.

* * * * *

UNITED STATES PATENT AND TRADEMARK OFFICE
CERTIFICATE OF CORRECTION

PATENT NO. : 5,417,183
DATED : May 23, 1995
INVENTOR(S) : Joseph C. Firey

Figure 3:
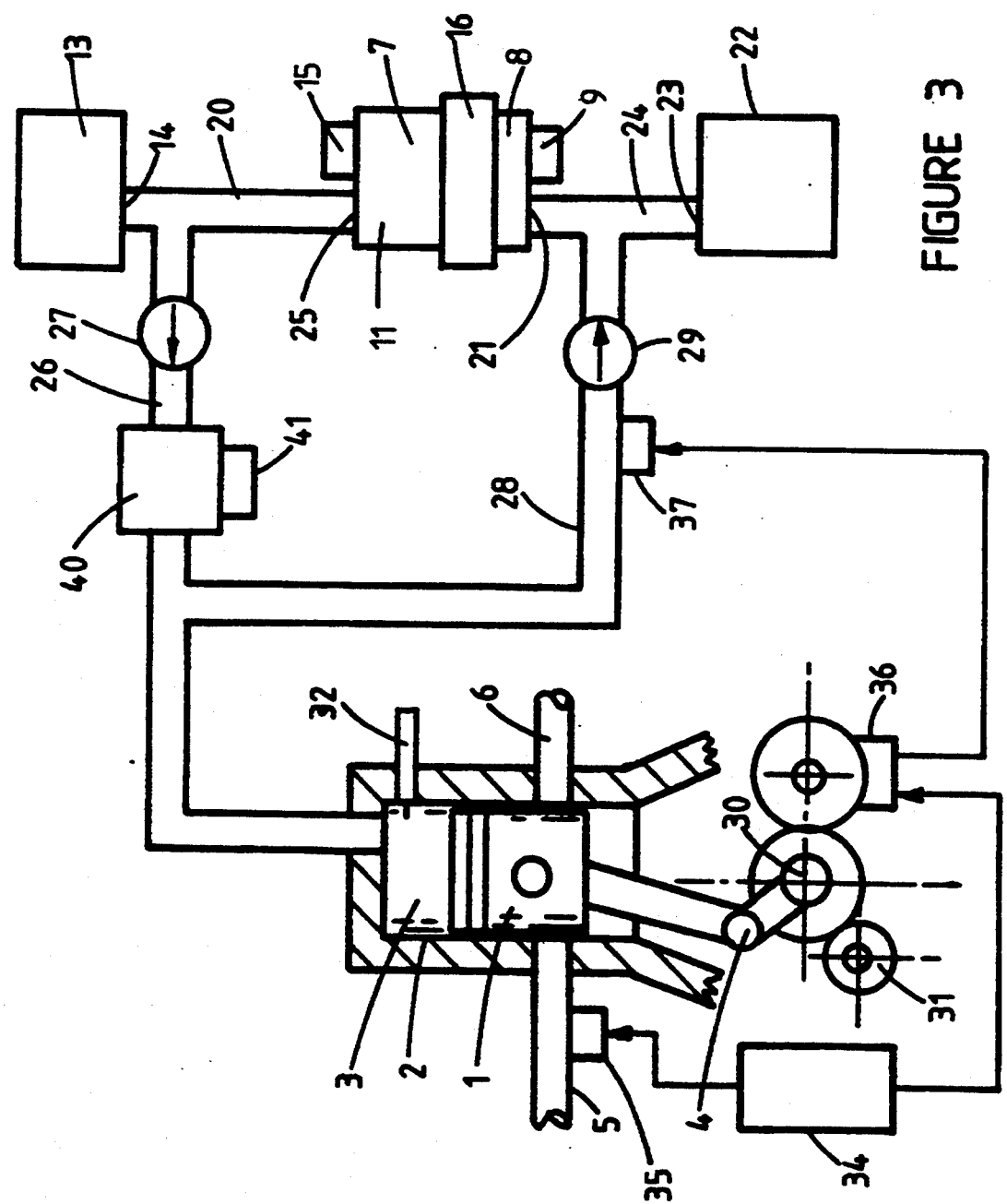
FIG. 3 shows a second embodiment of the combination of a piston engine and a char fuel gasifier.

It is certified that error appears in the above-indentified patent and that said Letters Patent is hereby corrected as shown below:

Col. 5, line 40; delete, "1:1" and replace with, -- 11 --:

Col. 6, line 42; delete, "8as," and replace with, -- gas --:

Col. 6, line 47; delete, "8as," and replace with, -- gas --:

Col. 7, line 56; delete, "8as," and replace with, -- gas --:

Col 7, line 57; delete, "16", and replace with, -- 18 --:

Col 7, line 63; delete, "8as," and replace with, -- gas --:

Col 8, line 20; add the following section between lines 20 and 21. as per applicant's amendment dated 11 Jan 1995;

--This alternative form of the invention is shown in Figure 3 wherein the gas flow opening, 21, connects to the refuel end, 8, of the primary reaction chamber, and the gas flow opening, 25, connects to the ash collection zone end, 11, of the primary reaction chamber, 7.--

Signed and Sealed this

Seventeenth Day of October, 1995

Attest:

BRUCE LEHMAN

Attesting Officer

Commissioner of Patents and Trademarks